US012586240B2

(12) United States Patent
Saito

(10) Patent No.: US 12,586,240 B2
(45) Date of Patent: Mar. 24, 2026

(54) IMAGE PROCESSING APPARATUS AND CONTROL METHOD FOR SAME

(71) Applicant: CANON KABUSHIKI KAISHA, Tokyo (JP)

(72) Inventor: Kenshi Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 399 days.

(21) Appl. No.: 18/365,253

(22) Filed: Aug. 4, 2023

(65) Prior Publication Data

US 2024/0070903 A1 Feb. 29, 2024

(30) Foreign Application Priority Data

Aug. 31, 2022 (JP) ................................ 2022-138342

(51) Int. Cl.
*G06T 7/73* (2017.01)
*G06T 7/11* (2017.01)

(52) U.S. Cl.
CPC .................. *G06T 7/73* (2017.01); *G06T 7/11* (2017.01); *G06T 2207/20076* (2013.01); *G06T 2207/20084* (2013.01); *G06T 2207/20104* (2013.01)

(58) Field of Classification Search
CPC ... G06T 7/73; G06T 7/11; G06T 2207/20076; G06T 2207/20084; G06T 2207/20104; G06T 2207/20021; G06V 10/25; G06V 10/82
See application file for complete search history.

(56) References Cited

U.S. PATENT DOCUMENTS

| | | | | |
|---|---|---|---|---|
| 8,837,773 B2 * | 9/2014 | Katano | G06T 7/248 382/103 |
| 2017/0147905 A1 * | 5/2017 | Huang | G06F 18/2411 |
| 2017/0309028 A1 * | 10/2017 | Nishiyama | G06T 7/11 |
| 2018/0357518 A1 * | 12/2018 | Sekii | G06V 40/103 |
| 2019/0180119 A1 * | 6/2019 | Chen | G06N 3/08 |
| 2019/0236394 A1 * | 8/2019 | Price | G06V 10/454 |

(Continued)

FOREIGN PATENT DOCUMENTS

JP 2020-173678 A 10/2020

OTHER PUBLICATIONS

Zhou, X. et al., "Objects as Points" arXiv:1904.07850v2 (Apr. 2019) pp. 1-12.

*Primary Examiner* — Bobbak Safaipour
(74) *Attorney, Agent, or Firm* — Carter, DeLuca & Farrell LLP

(57) ABSTRACT

An image processing apparatus comprises: an obtaining unit configured to obtain a captured image; a likelihood obtaining unit configured to obtain a likelihood map indicating a likelihood of existence of an object at each position of the captured image; a region obtaining unit configured to obtain, at each position of the captured image, a region tensor indicating a position and a size of an object with respect to each position; an accepting unit configured to accept first position coordinates with respect to the captured image; and a region determining unit configured to determine an object region corresponding to the first position coordinates, based on the region tensor and likelihoods of the likelihood map corresponding to two or more region candidates each indicated by the region tensor based on the first position coordinate.

11 Claims, 10 Drawing Sheets

(56) References Cited

U.S. PATENT DOCUMENTS

| | | | | |
|---|---|---|---|---|
| 2023/0065506 | A1 | 3/2023 | Tenkawa | |
| 2023/0237777 | A1 | 7/2023 | Saito | |
| 2023/0290106 | A1* | 9/2023 | Yamazaki | G06V 10/761 |
| 2024/0070912 | A1 | 2/2024 | Saito | |
| 2025/0299458 | A1* | 9/2025 | Monari | G06V 10/25 |

* cited by examiner

304

| | | | | | | | | | |
|---|---|---|---|---|---|---|---|---|---|
| 0 | 0 | 0 | 0 | 0 | 1 | 0 | 0 | 0 | 0 |
| 0 | 0 | 0 | 0 | 1 | 13 | 12 | 1 | 0 | 0 |
| 0 | 0 | 0 | 2 | 10 | 67 | 72 | 11 | 2 | 0 |
| 0 | 0 | 1 | 7 | 93 | 95 | 100 | 44 | 8 | 1 |
| 0 | 0 | 1 | 12 | 108 | 176 | 204 | 90 | 16 | 2 |
| 0 | 0 | 1 | 10 | 99 | 174 | 195 | 87 | 15 | 1 |
| 0 | 0 | 0 | 4 | 24 | 70 | 81 | 36 | 7 | 1 |
| 0 | 0 | 0 | 1 | 4 | 12 | 14 | 6 | 1 | 0 |

F I G. 4A
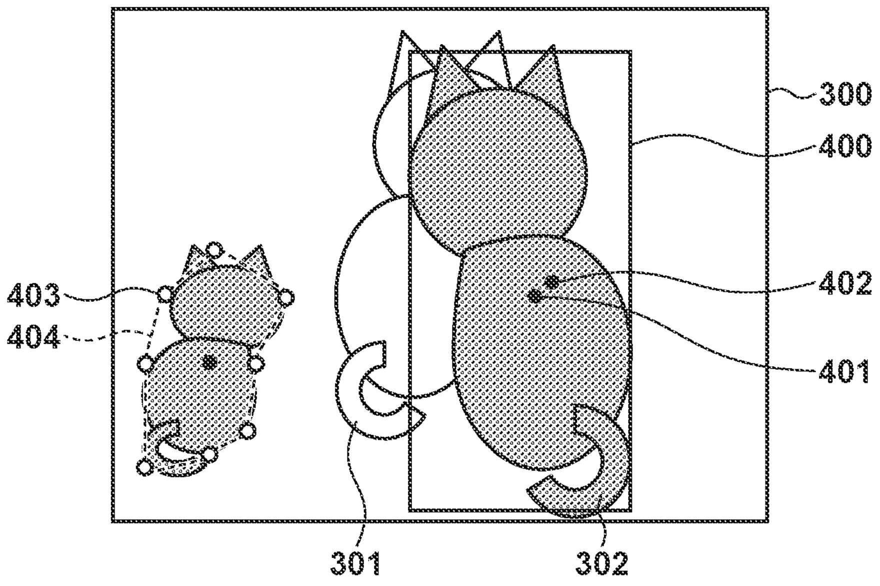

FIG. 4B

| | | | | | | | | | |
|---|---|---|---|---|---|---|---|---|---|
| 386 | 4 | 464 | 420 | 346 | 342 | 358 | 366 | 480 | 350 |
| 6 | 286 | 158 | 364 | 320 | 342 | 330 | 344 | 44 | 82 |
| 178 | 408 | 358 | 276 | 338 | 342 | 364 | 348 | 166 | 114 |
| 164 | 332 | 398 | 334 | 352 | 344 | 334 | 330 | 278 | 412 |
| 430 | 182 | 122 | 354 | 354 | 360 | 344 | 354 | 306 | 168 |
| 242 | 26 | 454 | 352 | 322 | 344 | 348 | 340 | 116 | 114 |
| -16 | 10 | -5 | -155 | -144 | -111 | -120 | -110 | -5 | -5 |
| 478 | 312 | 86 | 290 | 242 | 454 | 104 | 260 | 466 | 160 |

FIG. 4C

| | | | | | | | | | |
|---|---|---|---|---|---|---|---|---|---|
| 478 | 312 | 86 | 290 | 242 | 454 | 104 | 260 | 466 | 160 |
| 430 | 182 | 122 | 354 | 354 | 360 | 344 | 354 | 306 | 168 |
| 178 | 408 | 358 | 276 | 338 | 342 | 364 | 348 | 166 | 114 |
| 164 | 332 | 398 | 334 | 352 | 344 | 334 | 330 | 278 | 412 |
| 242 | 26 | 454 | 352 | 322 | 344 | 348 | 340 | 116 | 114 |
| 6 | 286 | 158 | 364 | 320 | 342 | 330 | 344 | 44 | 82 |
| 362 | 212 | 344 | 368 | 352 | 334 | 342 | 362 | 74 | 42 |
| 386 | 4 | 464 | 420 | 346 | 342 | 358 | 366 | 480 | 350 |

FIG. 4D

| | | | | | | | | | |
|---|---|---|---|---|---|---|---|---|---|
| 318 | 124 | 86 | 88 | 150 | 228 | 166 | 184 | 0 | 38 |
| 292 | 472 | 380 | 164 | 178 | 198 | 172 | 166 | 358 | 268 |
| 72 | 94 | 380 | 150 | 160 | 234 | 166 | 148 | 206 | 186 |
| 140 | 22 | 500 | 178 | 186 | 226 | 174 | 160 | 292 | 256 |
| 300 | 176 | 102 | 382 | 174 | 204 | 178 | 180 | 218 | 464 |
| 14 | 198 | 282 | 354 | 182 | 196 | 166 | 146 | 14 | 344 |
| 406 | 56 | 344 | 184 | 156 | 230 | 146 | 164 | 352 | 296 |
| 370 | 176 | 128 | 356 | 78 | 224 | 370 | 360 | 394 | 236 |

FIG. 4E

| | | | | | | | | | |
|---|---|---|---|---|---|---|---|---|---|
| 370 | 176 | 128 | 356 | 78 | 224 | 370 | 360 | 394 | 236 |
| 300 | 176 | 102 | 382 | 174 | 204 | 178 | 180 | 218 | 464 |
| 14 | 198 | 282 | 354 | 182 | 196 | 166 | 146 | 14 | 344 |
| 406 | 56 | 344 | 184 | 156 | 230 | 146 | 164 | 352 | 296 |
| 72 | 94 | 380 | 150 | 160 | 234 | 166 | 148 | 206 | 186 |
| 140 | 22 | 500 | 178 | 186 | 226 | 174 | 160 | 292 | 256 |
| 292 | 472 | 380 | 164 | 178 | 198 | 172 | 166 | 358 | 268 |
| 318 | 124 | 86 | 88 | 150 | 228 | 166 | 184 | 0 | 38 |

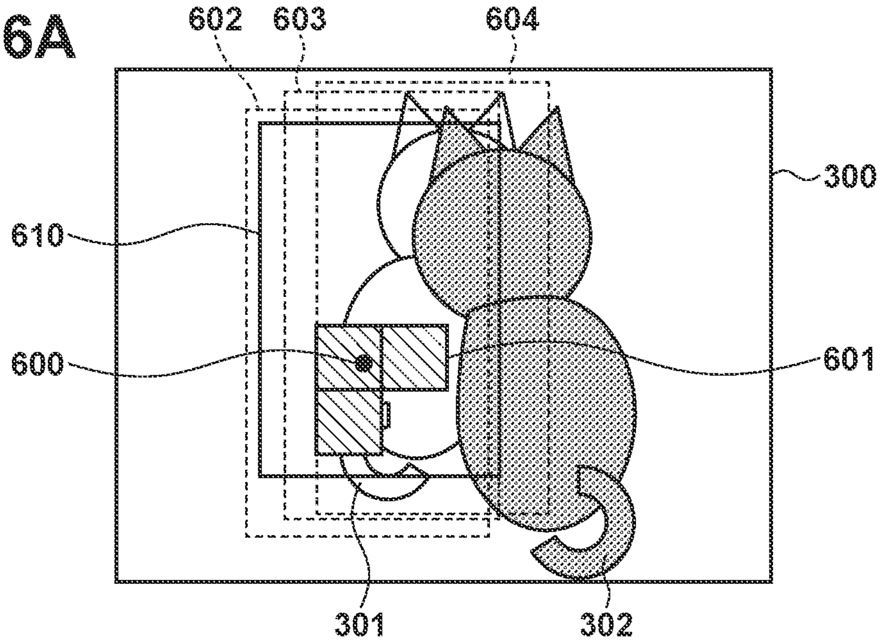
F I G.  6A
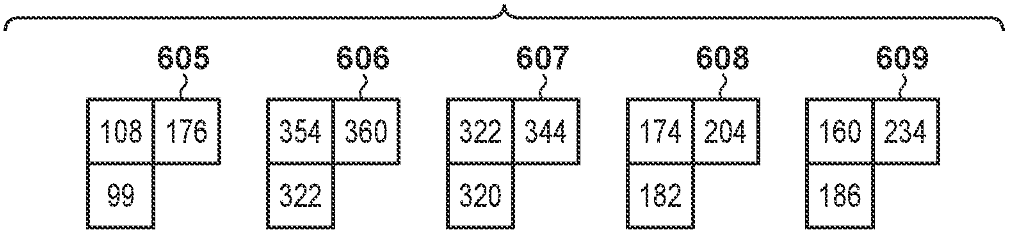
F I G.  6B
605    606    607    608    609
| 108 | 176 |  | 354 | 360 |  | 322 | 344 |  | 174 | 204 |  | 160 | 234 |
|-----|-----|--|-----|-----|--|-----|-----|--|-----|-----|--|-----|-----|
| 99 |  |  | 322 |  |  | 320 |  |  | 182 |  |  | 186 |  |
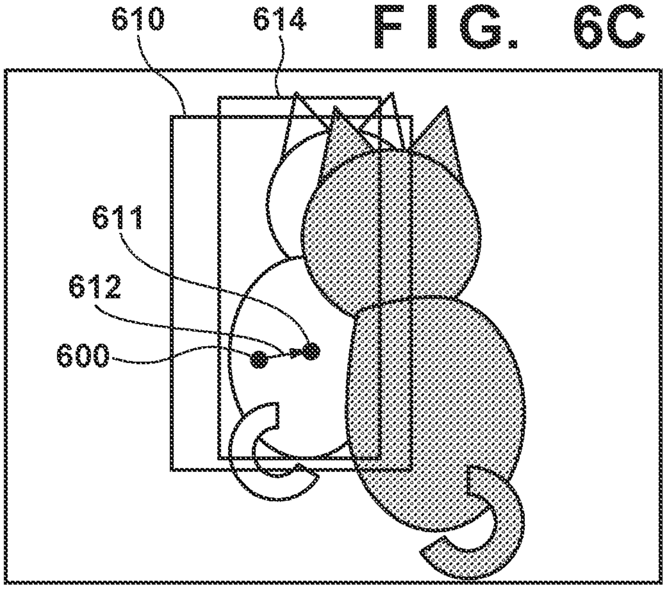
F I G.  6C
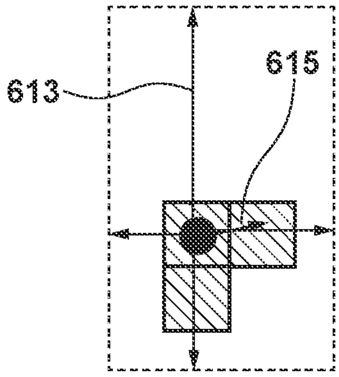
F I G.  6D

IMAGE PROCESSING APPARATUS AND CONTROL METHOD FOR SAME

BACKGROUND OF THE INVENTION

Field of the Invention

The present invention relates to a method for designating an object region in an image.

Description of the Related Art

Computer vision is a technique for understanding an image input to a computer and recognizing various characteristics of the image. The technique includes object detection that is a task of estimating a position and a type of an object existing in a natural image. Xingyi Zhou et al., "Objects as Points", 2019 (Non-Patent Literature 1) discloses a technique of obtaining a likelihood map indicating the center of an object by using a multilayer neural network and detecting the center position of the object by extracting the peak point in the likelihood map.

The object detection can be used for autofocus (AF) control of an image capturing apparatus. Japanese Patent Laid-Open No. 2020-173678 (Patent Literature 1) discloses a technique in which coordinates designated by a user are received and input to a multilayer neural network together with an image for identifying a main subject based on the user's intention, and autofocus control is performed.

Unfortunately, with Patent Literature 1, when the positioned designated by the user is deviated from the subject, the subject intended by the user is difficult to identify. Depending on the type, size, and appearance of the object designated by the user, the identification of the subject intended by the user becomes even more difficult. Therefore, an error in estimation of the likelihood of the presence of the subject or an error in estimation of a vector to the subject may result in identification of another subject not intended by the user.

SUMMARY OF THE INVENTION

According to one aspect of the present invention, an image processing apparatus, comprises: an obtaining unit configured to obtain a captured image; a likelihood obtaining unit configured to obtain a likelihood map indicating a likelihood of existence of an object at each position of the captured image; a region obtaining unit configured to obtain, at each position of the captured image, a region tensor indicating a position and a size of an object with respect to each position; an accepting unit configured to accept first position coordinates with respect to the captured image; and a region determining unit configured to determine an object region corresponding to the first position coordinates, based on the region tensor and likelihoods of the likelihood map corresponding to two or more region candidates each indicated by the region tensor based on the first position coordinate.

The present invention enables a subject region intended by the user to be more accurately identified.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4E illustrate an example of object region candidate obtaining (S203).

FIGS. 6A to 6D illustrate examples of object region candidate integration (S209) and selection position correction (S210).

DESCRIPTION OF THE EMBODIMENTS

Figure 1:
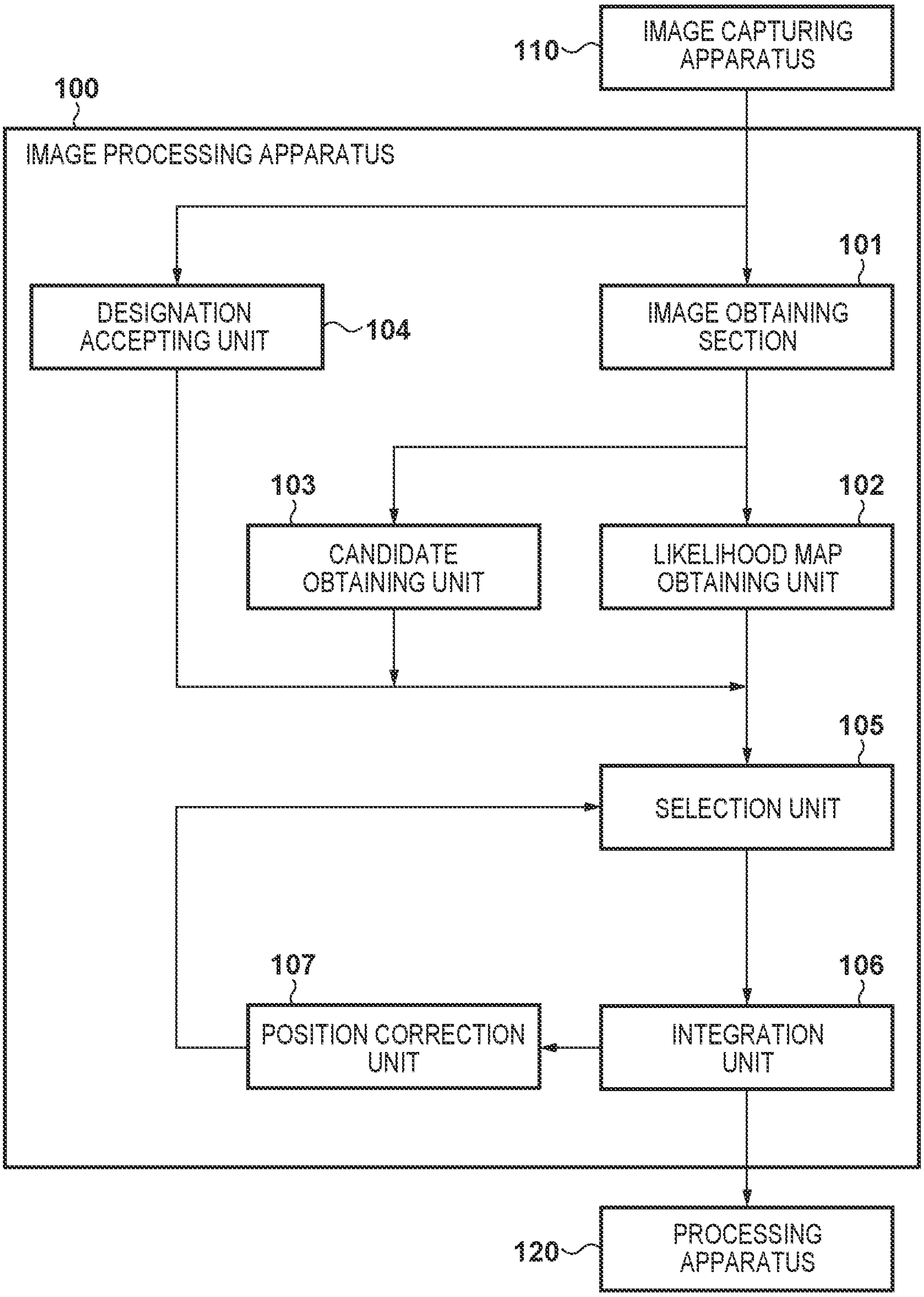
FIG. 1 illustrates a functional configuration of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An image processing apparatus for identifying an object region in a captured image will be described below as an example of a first embodiment of an image processing apparatus according to the present invention.

Apparatus Configuration

FIG. 1 illustrates a functional configuration of an image processing apparatus 100 according to a first embodiment. The image processing apparatus 100 performs processing of identifying an object region, which will be described below, on a captured image obtained by an image capturing apparatus 110, and outputs information on the identified object region to a processing apparatus 120.

The image capturing apparatus 110 includes an optical system, an image sensor, and the like, and outputs the captured image to the image processing apparatus 100. For example, a digital camera or a monitoring camera can be used as the image capturing apparatus 110. The image capturing apparatus 110 includes an interface that accepts an input from a user, and outputs information based on the input to the image processing apparatus 100. For example, the image capturing apparatus 110 includes a touch panel display as the interface, and outputs data on a touch operation result (touched position coordinates) from the user.

The processing apparatus 120, which is an external apparatus, performs processing (such as an autofocus function of a camera) using the information on the object region obtained from the image processing apparatus 100. For example, several distance measurement points can be sampled from the object region and used for phase difference AF.

The image processing apparatus 100 includes an image obtaining unit 101, a likelihood map obtaining unit 102, a candidate obtaining unit 103, a designation accepting unit 104, a selection unit 105, an integration unit 106, and a position correction unit 107. The image processing apparatus 100 may be included in a digital camera or a monitoring camera, or may be an independent processing apparatus.

The image obtaining unit 101 obtains the image (captured image) output from the image capturing apparatus 110. The likelihood map obtaining unit 102 calculates a likelihood map from the obtained image. The candidate obtaining unit 103 calculates an object region candidate from the obtained image.

The designation accepting unit 104 obtains user designation. Here, it is assumed that the coordinates designated by the touch operation performed by the user on the image capturing apparatus 110 are obtained from the image capturing apparatus 110.

Based on the likelihood map and the designated coordinates, the selection unit 105 selects one or more object region candidates from the object region candidates. The integration unit 106 integrates the selected object region candidates to calculate one object region. The position correction unit 107 calculates a selection position for reselecting an object region candidate based on the calculated "object region" or "combination of object region and likelihood maps".

Figure 10:
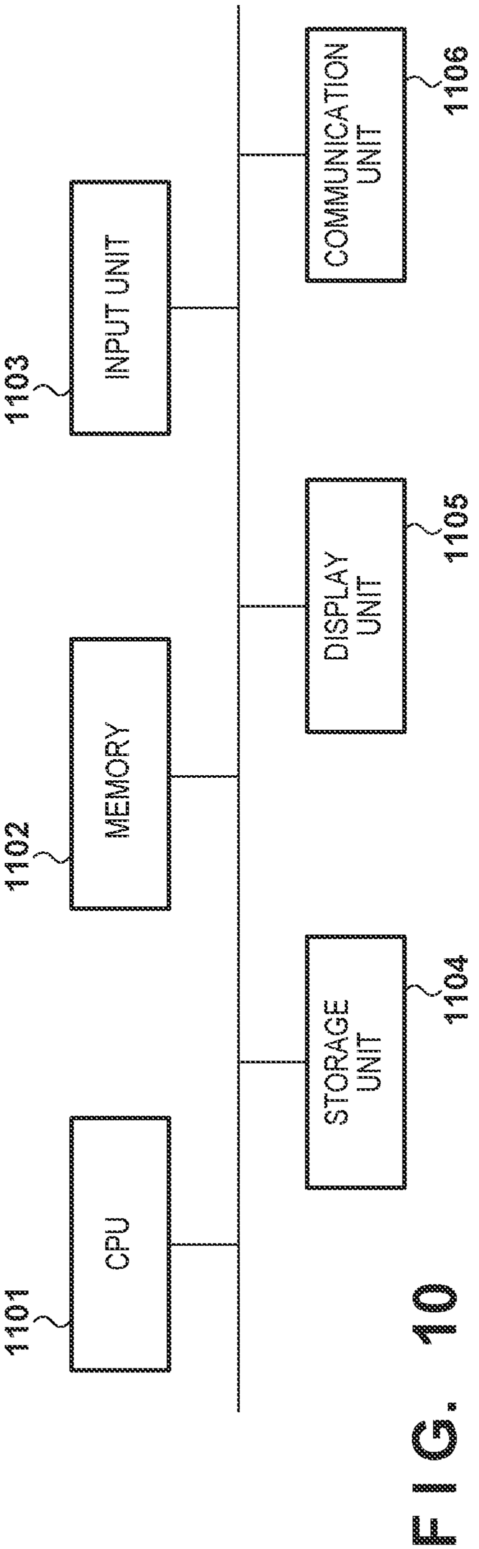
FIG. 10 illustrates a hardware configuration of the image processing apparatus.

FIG. 10 illustrates a hardware configuration of the image processing apparatus. The image processing apparatus 100 can be configured using a general-purpose information processor and includes a CPU 1101, a memory 1102, an input unit 1103, a storage unit 1104, a display unit 1105, a communication unit 1106, and the like. Each functional unit of the image processing apparatus 100 illustrated in FIG. 1 is realized when the CPU 1101 executes a control program.

Apparatus Operation

Figure 2:
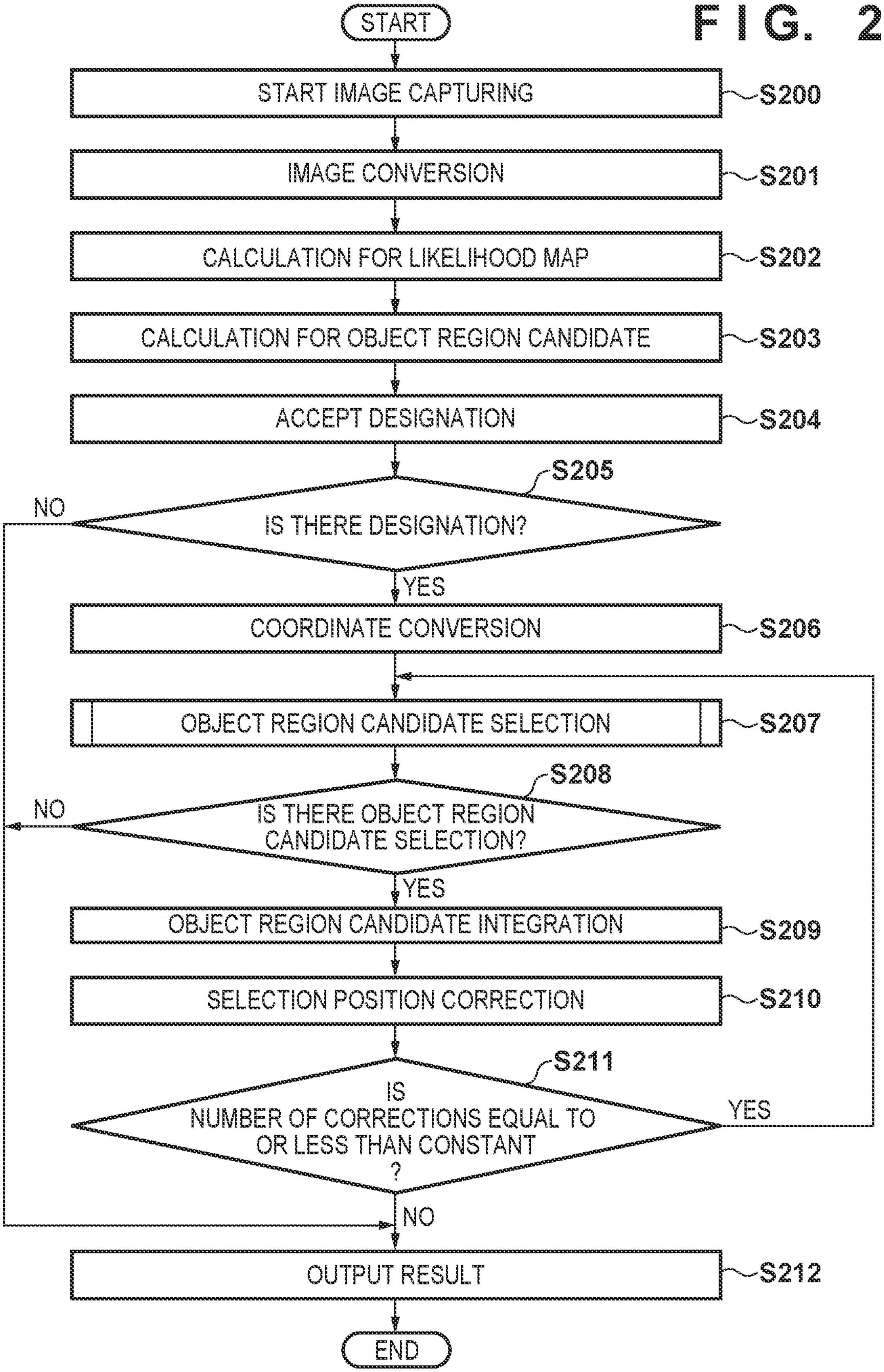
FIG. 2 is a flowchart illustrating processing executed by the image processing apparatus in the first embodiment.

FIG. 2 is a flowchart illustrating processing executed by the image processing apparatus in the first embodiment. First, an overall schematic operation will be described, and details of each step will be described below.

In S200, the image capturing apparatus 110 starts capturing an image and outputs the image (a frame image forming a moving image). The image obtaining unit 101 of the image processing apparatus 100 obtains the image output from the image capturing apparatus 110.

In S201, the image obtaining unit 101 converts the captured image into a predetermined resolution. In S202, the likelihood map obtaining unit 102 calculates a likelihood map by calculating a likelihood that the center of the object is located at each position (small region) of the image obtained by the resolution conversion in S202. In S203, the candidate obtaining unit 103 performs region calculation for the object region candidate in the image obtained by the resolution conversion in S202. As will be described below, the object region candidate is calculated in the form of a tensor.

In S204, the designation accepting unit 104 accepts coordinate designation from the user. As described above, here, the designation accepting unit 104 receives from the image capturing apparatus 110, the designated coordinates designated by the user on the image capturing apparatus 110. S205 branches based on the presence or absence of the designation in S204. When the designation has been made, the processing proceeds to S206. When no designation has been made, the processing proceeds to S212.

In S206, the designation accepting unit 104 converts the coordinates indicated by the accepted coordinate designation into coordinates corresponding to the image of the resolution converted in S201. In S207, the selection unit 105 selects one or more object region candidates based on given position coordinates (coordinates as a result of the conversion in S206 or coordinates calculated in S210 of the immediately preceding processing loop). Details of S207 will be described below, referring to FIG. 5.

In S208, the selection unit 105 decides whether one or more object region candidates have been selected in S207. When the selection has been made, the processing proceeds to S209. When the selection has not been made, the processing proceeds to S212. In S209, the integration unit 106 integrates the selected one or more object region candidates into one region.

In S210, the position correction unit 107 calculates the selection position obtained by correcting the coordinates (position) used to select the object region candidate in S209, based on the region obtained by the integration in S207 and the likelihood map calculated in S202.

In S211, the integration unit 106 decides whether the number of times of calculation for the selection position by the position correction unit 107 is less than a predetermined number of times. If the predetermined number of times has not been reached yet, the processing proceeds to S207, and the process loop from S207 to S211 is executed again using the corrected selection position as the new coordinates. On the other hand, when the predetermined number of times is reached, the processing proceeds to the S212.

In S212, the integration unit 106 outputs the region obtained by the integration in S209 to the processing apparatus 120. When it is decided No in S205 or No in S208 (in the first processing loop from S207 to S211), "no region" is output.

Details of Image Conversion (S201)

Here, description will be made on the assumption that the image obtained in the S200 is, for example, an RGB image with a width of 5000 pixels and a height of 4000 pixels. In S201, the captured image is converted into a predetermined size conforming to the input format of the multilayer neural network that calculates the likelihood map and the object region candidate.

In the present embodiment, the input size of the multilayer neural network is an RGB image with a width of 500 pixels and a height of 400 pixels. Therefore, in the present embodiment, it is assumed that the captured image obtained in S200 is reduced to 1/10, but the captured image may be reduced in other ways. For example, an RGB image with a width of 6000 pixels and a height of 4800 pixels may be generated by padding the black images on the upper, lower, left, and right sides of the captured image, and then the image may be reduced to 1/12. Alternatively, a predetermined region may be directly cut out from the captured image. In the converted image, the vertex at the upper left corner is assumed to be the origin coordinates (0,0). Coordinates (i,j) indicate the coordinates of a pixel in the j-th row and the i-th column of the image. The coordinates of a pixel at the vertex at the lower right corner are (499,399). Hereinafter, the coordinate system of the converted image is referred to as an "image coordinate system".

Details of Likelihood Map Obtaining (S202)

In the present embodiment, it is assumed that a likelihood map is calculated by a multilayer neural network as in Non-Patent Literature 1. A neural network included in the image capturing apparatus can be used, or a likelihood map calculated by a neural network included in an external apparatus can be obtained through a communication network and used. As described above, the input of the multilayer neural network is a resolution-converted image, which is a three channel (RGB) image with a width of 500 pixels and a height of 400 pixels. The output of the multilayer neural network is a 1-channel tensor (matrix) with 10 columns and 8 rows. The calculated tensor (matrix) is referred to as the likelihood map. In (the first channel of) the likelihood map, the vertex at the upper left corner is assumed to be the origin coordinates (0,0). Coordinates (i,j) indicate the coordinates of a pixel in the j-th row and the i-th column. The coordinates of a pixel at the vertex at the lower right corner are (9,7). Hereinafter, the coordinate system of the likelihood map is referred to as a "map coordinate system".

The multilayer neural network that calculates the likelihood map is trained in advance using a large number of pieces of training data (pairs of images and likelihood maps). For details, see Non-Patent Literature 1. In the present embodiment, the likelihood map is assumed to be a saliency map that reacts to any object, but may be a saliency map that reacts to only a specific object. The saliency map refers to a map in which an image represents a portion that is likely to be gazed by a person.

Figures 3A, 3B:
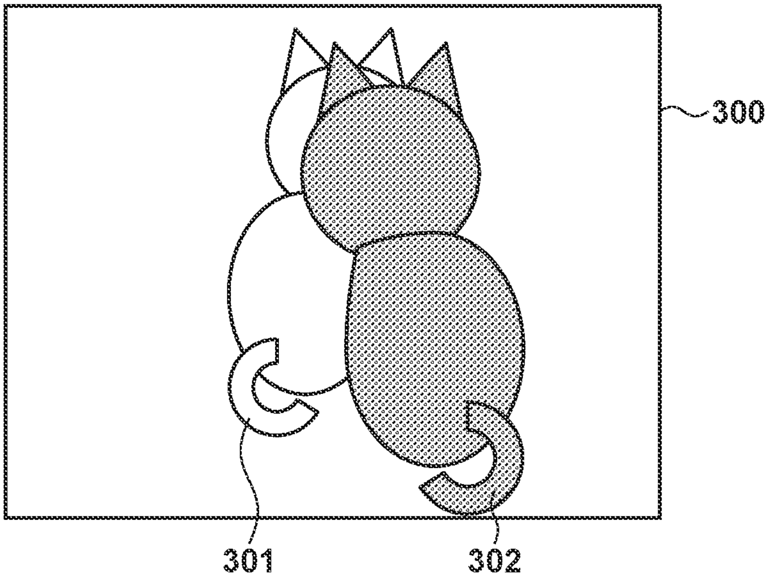
FIGS. 3A and 3B are diagrams illustrating examples of captured images including two subjects are captured and a likelihood map of thereof.

FIGS. 3A and 3B are diagrams illustrating examples of captured images including two subjects are captured and a likelihood map of thereof. FIG. 3A illustrates an example of an image-converted captured image. FIG. 3B illustrates an example of a likelihood map corresponding to the captured image.

An image-converted captured image 300 includes two subjects that are a subject 301 on the rear side (far side) and a subject 302 on the front side (near side). Each element region in the likelihood map indicates the likelihood of existence of an object at a location corresponding to the element region. The element region is used for the sake of illustration, and the element region can be associated with a pixel. The existence likelihood (the value of each element region) takes a value from 0 to 255, with a larger value indicating a higher existence likelihood. In FIG. 3B, each element region is illustrated with a lighter color for a lower likelihood, and is illustrated with a darker color for a higher likelihood. In a likelihood map 304, the likelihood is calculated to be particularly higher for the subject 302 on the front side, with the maximum likelihood "204" achieved at coordinates (6,4).

Details of Object Region Candidate Obtaining (S203)

As in the case of the likelihood map, the object region candidate is also calculated using a multilayer neural network. A neural network included in the image capturing apparatus can be used, or an object region candidate calculated by a neural network included in an external apparatus can be obtained through a communication network and used. As in the case where the likelihood map is calculated, the input of the multilayer neural network is a resolution-converted image, which is a three channel RGB image with a width of 500 pixels and a height of 400 pixels. The output of the multilayer neural network is a 4-channel tensor with 10 columns and 8 rows. Specifically, the outputs is a region tensor at the position of each of small regions obtained by dividing the resolution-converted image into j×i small regions of j rows and i columns (here, j=10 and i=8).

The first channel of the region tensor indicates a distance from each element region to the left end of the object contour. Similarly, the second channel indicates a distance to the upper end of the object contour, the third channel indicates a distance to the left end of the object contour, and the fourth channel indicates a distance to the lower end of the object contour. From the information of the total of four channels, the center position of the object and the size of the object can be calculated. This region tensor is hereinafter referred to as an "object region candidate tensor".

Two channels may be added to the object region candidate tensor to form an offset map representing distances to the object center position in the horizontal direction and the vertical direction. Still, since the present embodiment focuses on a method of calculating the object center position by selection position correction to be described below, the following description will be made on the assumption that the object region candidate tensor is of four channels only.

In the following description, it is assumed that each channel of the object region candidate tensor has the same numbers of rows and columns as the likelihood map, and the coordinate system thereof is also the map coordinate system. However, the number of columns and the number of rows of each channel of the object region candidate tensor may be different from those of the likelihood map, and when they are different, matching of the number of rows and the number of columns may be made through interpolation (for example, bilinear interpolation).

As in the case where the likelihood map is calculated, the multilayer neural network calculating the object region candidate tensor is trained in advance using a large number of pieces of training data (a set of distances from the image to the upper, the lower, the left, and the right ends of the object contour). In the present embodiment, a multilayer neural network that simultaneously outputs information of four channels is assumed. Alternatively, four multilayer neural networks that each output one channel may be prepared and the results may be combined.

FIGS. 4A to 4E illustrate an example of object region candidate obtaining (S203). FIG. 4A illustrates an example of an image-converted captured image. FIGS. 4B to 4E illustrate distance maps related to a rectangle 400 surrounding an object. More specifically, FIG. 4B illustrates a distance map to the upper end of the rectangle 400, FIG. 4C illustrates a distance map to the lower end of the rectangle 400, FIG. 4D illustrates a distance map to the right end of the rectangle 400, and FIG. 4E illustrates a distance map to the left end of the rectangle 400. The unit of the distance (numerical value) indicated in each element region is a pixel.

Here, the description is given while focusing on the coordinates (6,4) where the maximum likelihood is obtained in FIG. 3B. The black and white reversed element regions in 4B to 4E of the drawing are the corresponding portions of interest. In FIG. 4A, a point indicated by a point 401 is a position on the image corresponding to the portion of interest. The map coordinates can be converted into image coordinates using the following Formula (1):

$$(I_x, I_y) = \left(M_x \times \frac{I_w}{M_w} + \frac{I_w}{2M_w}, M_y \times \frac{I_h}{M_H} + \frac{I_h}{2M_H}\right), \tag{1}$$

where $I_w$ and $I_h$ respectively represent the width and height of the image-converted captured image, and $M_w$ and $M_h$ respectively represent the width and height of the map. Furthermore, $(I_x, I_y)$ represents a point in the image coordinate system, and $(M_x, M_y)$ represents a point in the map coordinate system. According to Formula (1), the map coordinate point (6,4) is converted to image coordinates (325,225). In other words, the image coordinates at the point 401 in FIG. 4A are (325,225).

As can be respectively seen in FIGS. 4B to 4E, the distances to the ends (upper, lower, left, and right) of the rectangle surrounding the object at the portion of interest are "344", "348", "178", and "166". As described above, the object region candidate 400 in the portion of interest is expressed by a rectangle with four sides located at the distances of "344", "348", "178", and "166" in four respective directions (upward, downward, leftward, and rightward), based on the coordinates (325,225) in the image coordinate system.

In the present embodiment, the object region candidate is expressed by the distances to the ends (upper, lower, left, and right) of the rectangle, but may be expressed in other ways. For example, the object region candidate may be defined by a plurality of sides 404 connecting a plurality of points 403 on the boundary of the region surrounding the object, and may be expressed by the distance from $(I_x,I_y)$ corresponding to each map coordinate to each point.

Details of Object Region Candidate Selection (S207)

Figure 5:
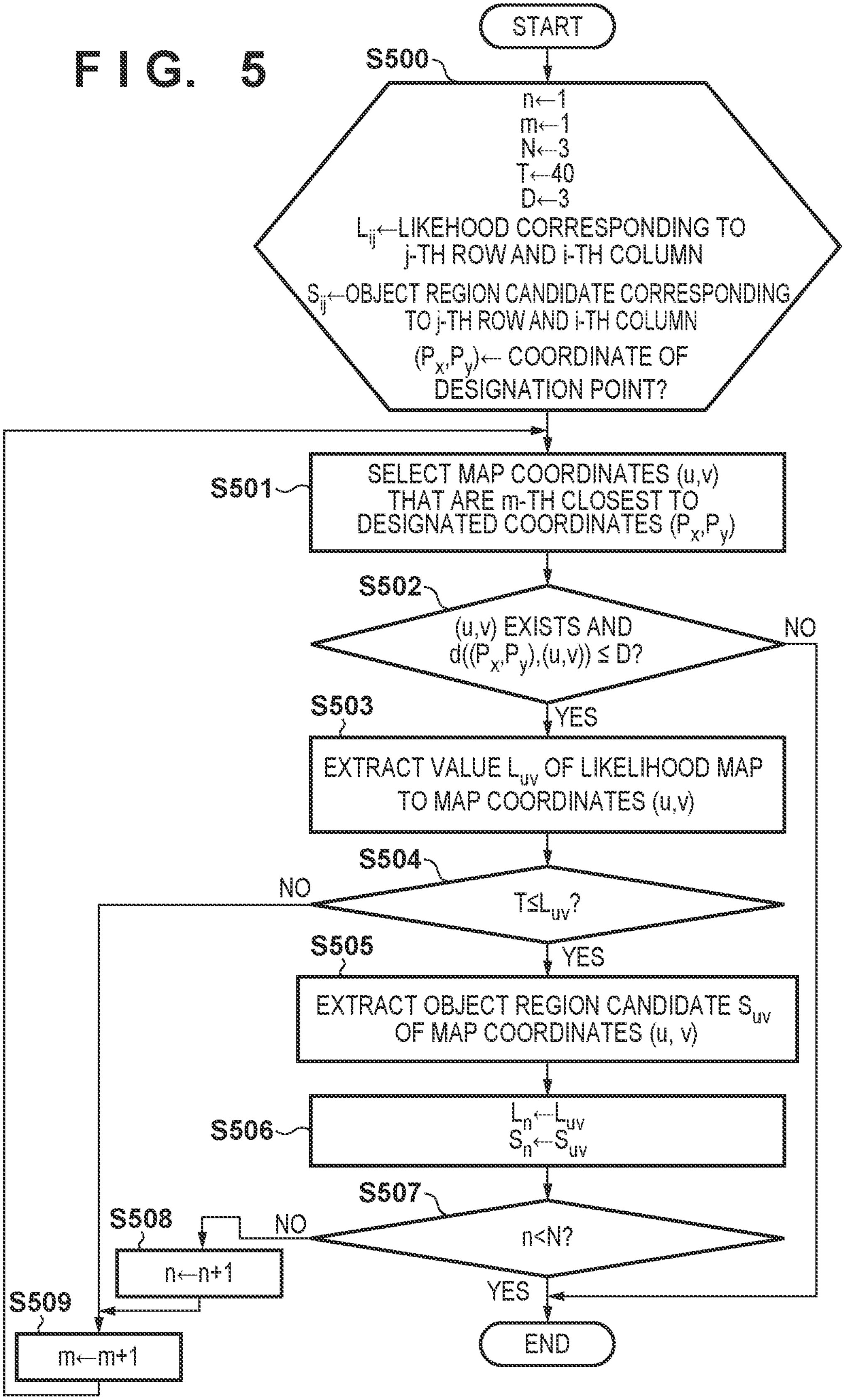
FIG. 5 is a detailed flowchart of object region candidate selection (S207).

FIG. 5 is a flowchart illustrating the object region candidate selection (S207) in detail.

In S500, the selection unit 105 initializes each variable. Note that n and m are counters, N is the number of object region candidates to be selected, T is a threshold of the likelihood threshold value, D is a threshold of the distance, $L_{ij}$ is the likelihood corresponding to the j-th row and the i-th column of the map coordinate system, and $S_{ij}$ is an object region candidate corresponding to the j-th row and the i-th column of the map coordinate system. Furthermore, $(P_x,P_y)$ is designated coordinates obtained by the designation accepting unit 104. Note that the designated coordinates $(P_x,P_y)$ are obtained by converting the designated coordinates given in the image coordinate system into those in the map coordinate system based on Formula (1), and are a two dimensional real number vector.

In S501, the selection unit 105 selects map coordinates (u,v) that are the m-th closest to the designated coordinates $(P_x,P_y)$ from among all the map coordinates. Note that (u,v) is a two dimensional positive integer vector.

In S502, the selection unit 105 decides whether (u,v) is exists and the distance between $(P_x,P_y)$ and (u,v) is equal to or shorter than the threshold D. When determined Yes, the processing proceeds to S503, and otherwise the processing ends. In the present embodiment, the Euclidean distance expressed by Formula (2) is used as a distance function for deriving the distance, but other distance function may be used.

$$d((P_x,P_y),(u,v))=\sqrt{(P_x-u)^2+(P_y-v)^2} \tag{2}$$

In S503, the selection unit 105 extracts a value $L_{uv}$ of the likelihood map at the position corresponding to the map coordinates (u,v).

In S504, the selection unit 105 compares $L_{uv}$ with the likelihood threshold T. When $L_{uv}$ is equal to or greater than T, the processing proceeds to S505. When $L_{uv}$ is less than T, the processing proceeds to S509 where m is incremented (by 1), and then returns to S501.

In S505, the selection unit 105 extracts an object region candidate $S_{uv}$ corresponding to the map coordinates (u,v).

In S506, the selection unit 105 stores the current likelihood $L_{uv}$ and the object region candidate $S_{uv}$ as $L_n$ and $S_n$, respectively.

In S507, the selection unit 105 compares n with N. When n is equal to or greater than N, the processing ends. On the other hand, when n is less than N, the processing proceeds to S508 where n is incremented (by 1), proceeds to S509 where m is incremented (by 1), and then returns to S501.

While the predetermined number N of object region candidates are selected in the present embodiment, how the number of object region candidates to be selected is determined is not limited to this. For example, the object region candidates may be selected to make the sum of the likelihoods L n equal to or greater than a predetermined value.

Details of Object Region Candidate Integration (S209)

Here, while it is assumed that the user selects the subject 301 on the rear side in FIG. 3A, similar processing is executed with only the designated coordinates changed, also when the subject 302 on the front side is selected.

FIG. 6A and FIG. 6B are diagrams illustrating the object region candidate integration (S209). As illustrated in FIG. 6A as an example, when the user wishes to select the subject 301 in the captured image 300, the user designates coordinates 600 (for example, by a touch operation). Here, the designated coordinates are (235,245) in the image coordinate system, and are (4.2,4.4) when converted into the map coordinate system using Formula (1).

Therefore, when the above-described object region candidate selection processing is performed, a hatched region 601 is selected. Specifically, the hatched region 601 is a region including (4,4), (4,5), and (5,4) which are respectively closest, the second closest, and the third closest to (4.2,4.4) in the map coordinate system. Therefore, $L_{44}$, $L_{45}$, and $L_{54}$ are respectively stored as likelihoods $L_1$, $L_2$, and $L_3$. Further, $S_{44}$, $S_{45}$, and $S_{54}$ are respectively stored as object region candidates $S_1$, $S_2$, and $S_3$. Rectangles 602, 603, and 604 illustrate object region candidates corresponding to $S_{44}$, $S_{45}$, and $S_{54}$, respectively.

Values in regions 605 to 609 illustrated in FIG. 6B respectively represent "likelihood", "distance to upper end of rectangle", "distance to lower end of rectangle", distance to right end of rectangle", and "distance to left end of rectangle" corresponding to the hatched region 601. A rectangular region 610 indicates a result of the object region candidate integration (region determination for object region).

The object region candidate integration will be described using a specific calculation example. First of all, the center position of the object region candidate in the image coordinate system is calculated. According to Formula (1), the image coordinates corresponding to the map coordinates (4,4) are (225,225). Similarly, the center position of $S_{45}$ and the center position of Sm can be calculated.

A weighted average of likelihoods is used for the object region candidate integration. The weighted average of the likelihoods can be calculated using the following Formula (3):

$$x = \frac{\sum_{n=1}^{N} L_n \times x_n}{\sum_{n=1}^{N} L_n}, \tag{3}$$

where $X_n$ is the value for which the weighted average is obtained, and x is the resultant weighted average. For example, the x coordinate of the center position of the integrated object region may be obtained by substituting the x coordinate of the center position of the object region candidate corresponding to $S_n$, into $x_n$. Similarly, by substituting the y coordinate of the center position and the distances to the respective ends (upper, lower, left, and right) of the rectangle into Formula (3), the center position (x coordinate, y coordinate) of the integrated object region and the distances to the ends (upper, lower, left, and right) of the rectangle can be obtained.

By substituting 0 for the initial value of the likelihood $L_n$, even when the number of object region candidates exceeding the likelihood threshold T within the range of the distance threshold D is less than the predetermined number N, the integrated object region can be calculated using Formula (3). When all the likelihoods L n are 0, "no object region" is determined.

Details of Selection Position Correction (S210)

FIG. 6C and FIG. 6D are diagrams illustrating the selection position correction (S210). The position correction unit 107 corrects the user-designated coordinates 600 using the object region and the likelihood map obtained by the integration unit 106. In FIG. 6C, an example is illustrated where the designated coordinates 600 are corrected to coordinates 611.

One of the correction methods is a method of setting the center of the object region obtained by the integration unit 106 as a new selection position. As described above for the object region candidate calculation, the center of each object region candidate corresponds to the "center of rectangle surrounding object" calculated from $(I_x,I_y)$ obtained by converting a point in the map coordinate system into a point in the image coordinate system. Therefore, the coordinates 611 obtained by weighted averaging the rectangular region 610 obtained by the integration with the values of the likelihood map can be regarded as the "center of rectangle surrounding object" based on the object likelihood.

Thus, except for a case where any of the object region candidates $S_1$, $S_2$, and $S_3$ includes a region of another object, a vector 612 from the designated coordinates 600 to the coordinates 611 of the rectangular region 610 is a vector in a direction to the center of the object.

While the center of the object integration frame is defined as the coordinates 611 in the above description, coordinates based on another reference may be calculated. Another calculation method is described with reference to FIG. 6D. Distance map values to the ends (upper, lower, left, and right) of the rectangle in each of the object region candidates $S_1$, $S_2$, and $S_3$ are regarded as vectors 613 to the ends of the object region. Then, a vector 615 obtained by weighted averaging the vectors and the likelihood map values using Formula (3) is applied to the designated coordinates 600 to obtain the corrected coordinates 611. In this case, a large norm is obtained compared with that with the vector 612 obtained by setting the center of the object integration frame as the corrected coordinates. Thus, the selection position correction effect can be further improved.

Details of Result Output (S212)

In the second processing loop (S207 to S211), the coordinates 611 calculated in the first processing loop are set as the designated coordinates for the object region candidate selection (S207), and the same processing is executed. In the present embodiment, the processing loop is repeated N times (N is an integer equal to or greater than 1), and the integration unit 106 outputs the result of the N-th object region candidate integration to the processing apparatus 120.

<Effect>

As described above, according to the first embodiment, it is possible to move the user-designated coordinates to coordinates closer to the object center without additionally learning center position correction information such as an offset map. For example, even when the user designates a position deviated from the center position of the desired object, the center position of the desired object can be identified more accurately. Furthermore, by selecting and integrating object region candidates using the calculated coordinates, a more accurate object region can be obtained.

In other words, a more accurate object region can be obtained even for a subject for which learning of an offset map and a likelihood map is difficult or even when the numbers of channels of object region candidate tensor is limited.

Second Embodiment

In the above-described first embodiment, the number of times (the number of loops) of the selection position is corrected is constant. However, if the number of times the correction is performed is too large, the corrected selection position may be deviated from the center of the subject intended by the user. For example, when the distance map values to the ends of the rectangle expressed by the object region candidate tensor are inaccurate (for example, due to inclusion of neighbors), the corrected selection position will be deviated from the desired subject. Also, when there are many object region candidates corresponding to map coordinates with low object likelihood, the corrected selection position is deviated from the desired subject.

Therefore, in the second embodiment, a mode will be described in which the corrected selection position is evaluated to decide whether to continue the execution of the processing loop.

Apparatus Configuration

Figure 7:
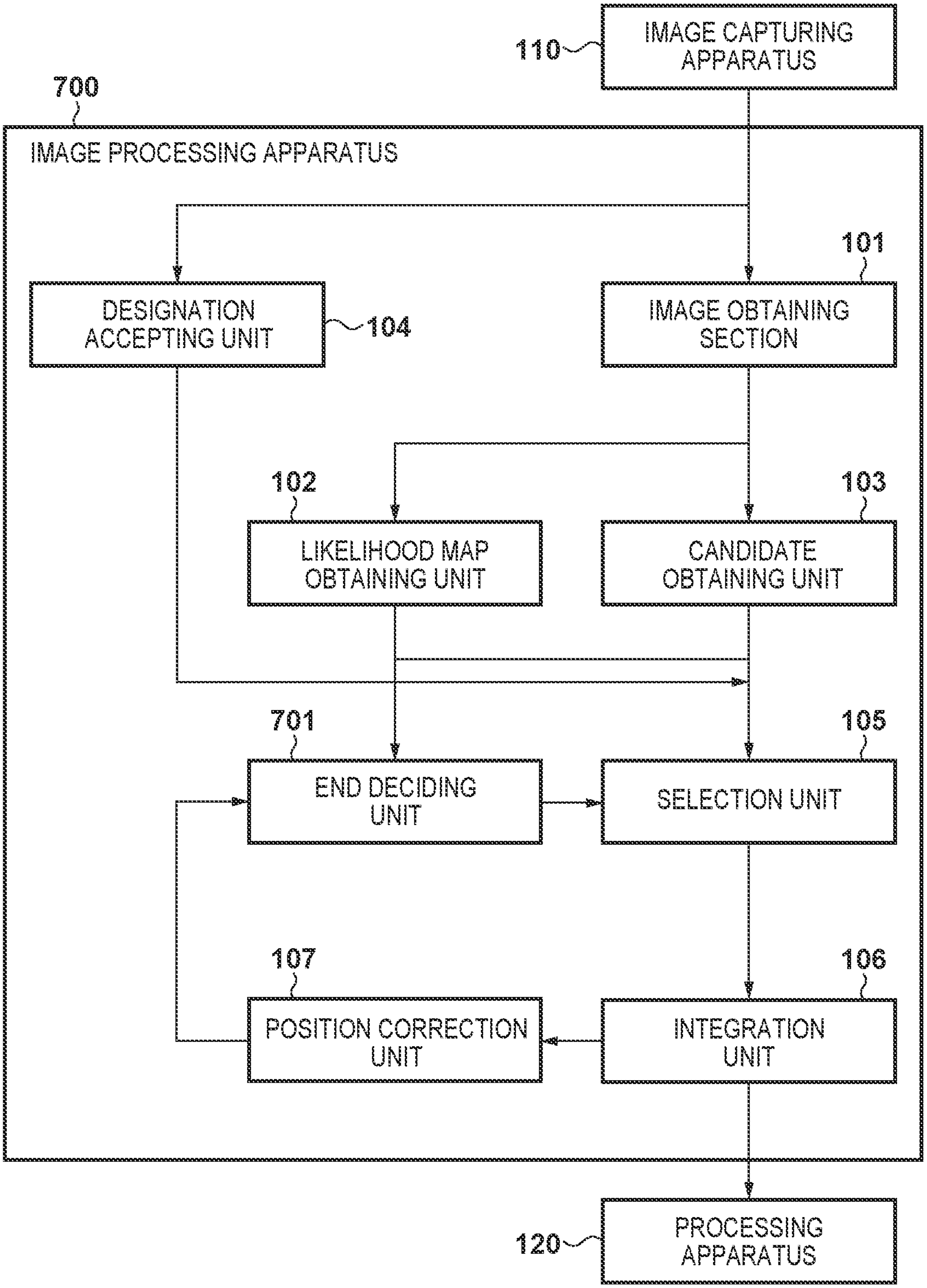
FIG. 7 illustrates a functional configuration of an image processing apparatus according to a second embodiment.

FIG. 7 illustrates a functional configuration of an image processing apparatus 700 according to a first embodiment. The difference from the first embodiment (FIG. 1) lies in a fact that an end deciding unit 701 is further included. The hardware configuration of the image processing apparatus 700 is similar to that in the first embodiment (FIG. 10) and thus the description thereof will be omitted.

The end deciding unit 701 evaluates the result from the position correction unit 107 and the result from the likelihood map obtaining unit 102, to determine whether to end the correction by the position correction unit 107. When the correction is decided not to be ended (executed again), the processing by the selection unit 105, the integration unit 106, and the position correction unit 107 is executed again. On the other hand, when the correction is determined to end, the integration unit 106 outputs the object region at that time to the processing apparatus 120 as a processing result.

Apparatus Operation

Figure 8:
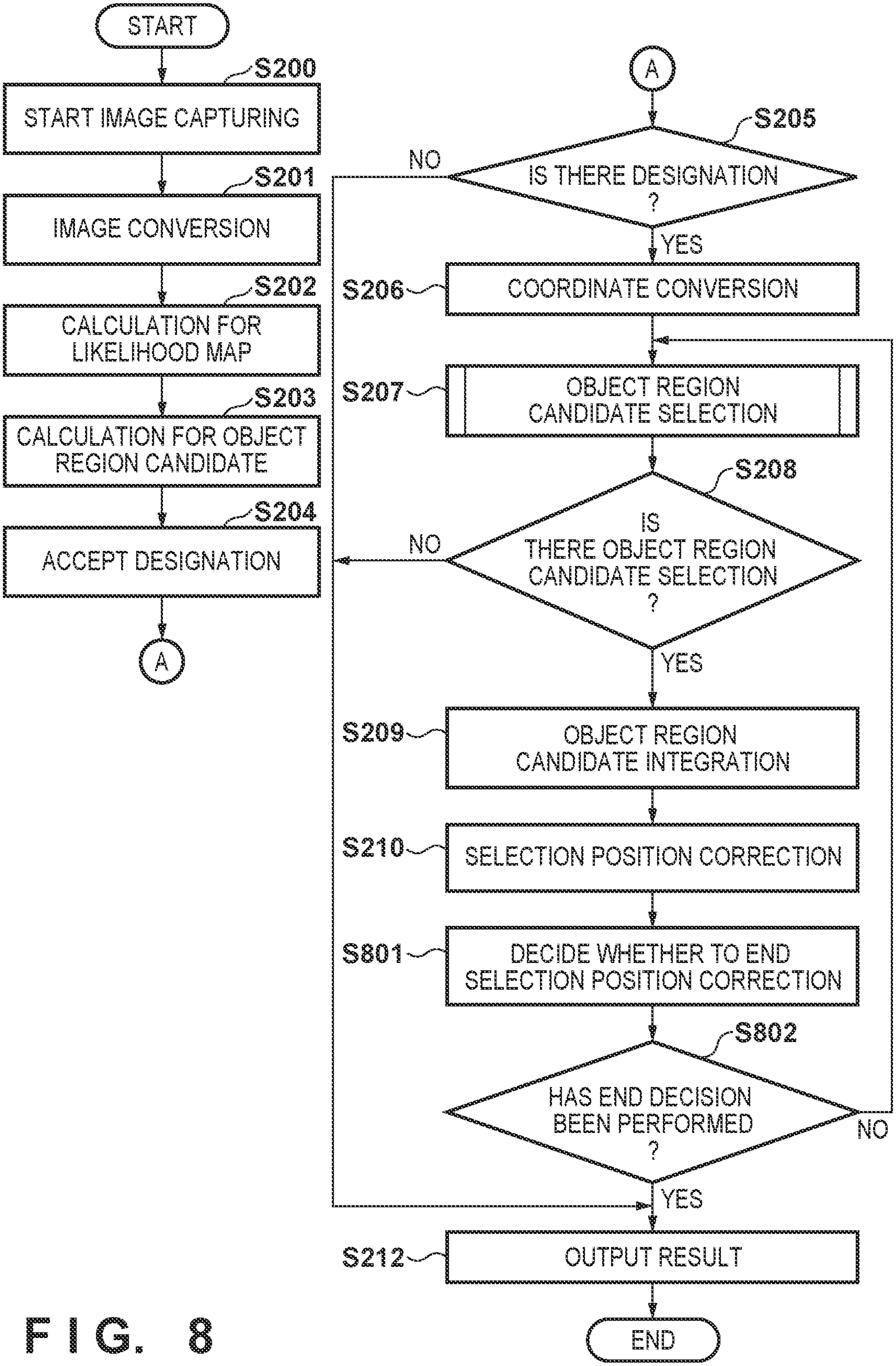
FIG. 8 is a flowchart illustrating processing executed by an information processing apparatus in the second embodiment.

FIG. 8 is a flowchart illustrating processing executed by the image processing apparatus in the second embodiment. The basic processing flow is the same as that in the first embodiment (FIG. 2). The difference is that S801 and S802 are executed instead of S211.

In S801, the processing result (correction of the selection position) obtained in the immediately preceding processing loop (S207 to S210) is evaluated, and a decision as to whether to end the correction processing (processing loop) is made. For example, when the correction of the selection position has been successful, a decision to not end the correction is made. When the correction has failed, a decision to end the correction is made. In S802, when the decision to end the processing is made in S801, the processing proceeds to S212, and the object region obtained in the immediately preceding S209 is output. On the other hand, when it is decided in S801 that the processing is not to be ended, the processing returns to S207, and the next processing loop is executed using the selection position obtained in S210 as the designated coordinates.

Details of Correction End Decision (S801)

The end deciding unit 701 calculates a distance between the corrected position (coordinates 611) most currently calculated by the position correction unit 107, and each point ($I_x$,$I_y$) obtained by converting a point in the map coordinate system into a point in the image coordinate system. Then, the likelihood map at the map coordinates corresponding to the point closest to the correction position is set as a likelihood $L_4$. The likelihood map value corresponding to the user-designated coordinates 600 (that is, coordinates before correction) calculated in the S209 is defined as $L_1$.

Figure 9A:
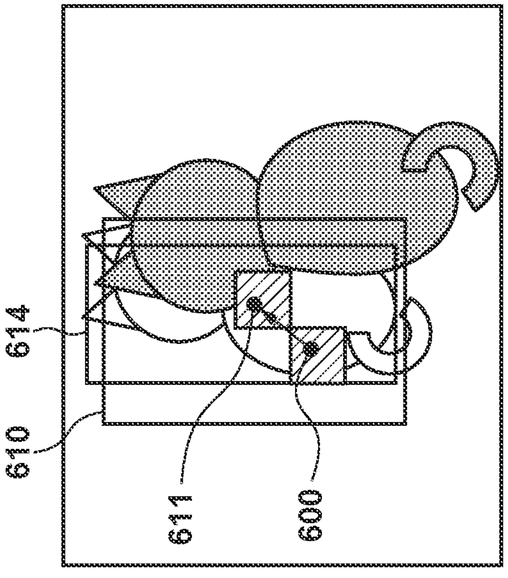
FIGS. 9A and 9B illustrate an example of how the selection position correction (S210) succeeds and fails.

FIG. 9A illustrates an example of how the selection position correction (S210) succeeds. In FIG. 9A, $L_4$ is larger than $L_1$, and it can be evaluated that the coordinates 611 exists at a position more likely to be the center of the object than the designated coordinates 600 on the likelihood map. In other words, it can be decided that the correction of the selection position has been successful. Therefore, a better result is expected to be obtained by continuously determining the object region based on the corrected position. Thus, the end deciding unit 701 determines not to end the processing loop (executed again), the processing by the selection unit 105, the integration unit 106, and the position correction unit 107 is executed again.

Figure 9B:
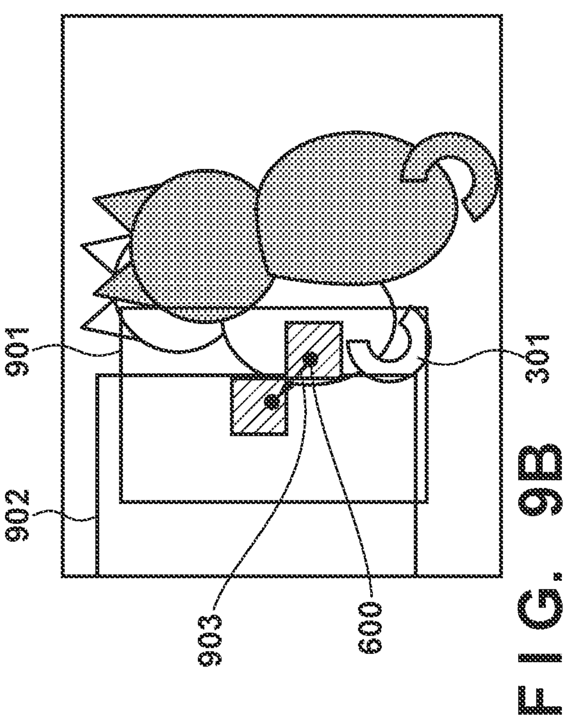

FIG. 9B illustrates an example of how the selection position correction (S210) fails. In FIG. 9B, $L_4$ is smaller than $L_1$. This is expected to occur in the following two situations.

- A case where deviation occurs in a direction (vector 903) away from the subject (subject 301) intended by the user.
- A case where the likelihood map obtaining unit 102 erroneously calculates a low likelihood.

In any of these cases, when the difference between the L1 and the L4 is large, it cannot be regarded that the coordinates 611 are calculated as a point closer to the subject (subject 301) designated by the user. Therefore, a better result is expected not to be obtained, even when the object region is continuously determined based on the corrected position. Therefore, the end deciding unit 701 determines to end the execution of the processing loop, and avoids the risk of the deviation from the subject designated by the user as a result of executing the correction processing again.

<Effect>

According to the second embodiment, the processing result (correction of the selection position) obtained in the immediately preceding processing loop is evaluated to decide whether to end the correction processing (processing loop). This makes it possible to avoid an adverse effect (i.e., erroneous determination of an object region) caused by a correction failure of a selection position caused as a result of the correction performed for an excessive number of times.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-138342, filed Aug. 31, 2022, which is hereby incorporated by reference herein in its entirety.

What is claimed is:

1. An image processing apparatus, comprising:

at least one processor; and at least one memory having stored thereon instructions which, when executed by the at least one processor, cause the image processing apparatus at least to:

obtain a captured image;

obtain a likelihood map indicating a likelihood of existence of an object at each position of the captured image;

obtain, at each position of the captured image, a region tensor indicating a position and a size of an object with respect to each position;

accept first position coordinates with respect to the captured image;

determine an object region corresponding to the first position coordinates, based on the region tensor and likelihoods of the likelihood map corresponding to two or more region candidates each indicated by the region tensor based on the first position coordinate;

determine a first object region based on the first position coordinates and a second object region based on second position coordinates determined from the first object region;

decide a larger one of a first likelihood value corresponding to the first position coordinates in the likelihood map and a second likelihood value corresponding to the second position coordinates with respect to center of the object region in the likelihood map; and output the first object region to an external apparatus if it is decided that the first likelihood value is larger than the second likelihood value, and output the second object region to the external apparatus if it is decided that the first likelihood value is larger than the second likelihood value.

2. The image processing apparatus according to claim 1, wherein a region tensor at a position of each of small regions obtained by dividing the captured image into j×i small regions of j rows and I columns is obtained, and two or more region candidates corresponding to two or more small regions relatively close to the first position coordinates among the j×i small regions are selected.

3. The image processing apparatus according to claim 1, wherein the region tensor is a tensor indicating a distance from each position of the captured image to each of a plurality of points on a boundary of a region surrounding the object.

4. The image processing apparatus according to claim 1, wherein the likelihood map is obtained by using a first multilayer neural network trained in advance.

5. The image processing apparatus according to claim 1, wherein the region tensor is obtained by using a second multilayer neural network trained in advance.

6. The image processing apparatus according to claim 1, wherein the object region is determined by integrating the two or more region candidates by weighted averaging using the likelihood in the likelihood map as a weight.

7. The image processing apparatus according to claim 1, wherein the instructions further cause the image processing apparatus to:

determine a third object region based on third position coordinates determined from the second object region;

decide a larger one of the second likelihood value and a third likelihood value corresponding to the third position coordinates in the likelihood map; and output the second object region to the external apparatus if it is decided that the second likelihood value is larger than the third likelihood value, and output the third object region to the external apparatus if it is decided that the second likelihood value is larger than the third likelihood value.

8. The image processing apparatus according to claim 1, further comprising:

a touch panel display that displays the captured image, wherein the first position coordinates are position coordinates determined based on a touch operation made by a user on the touch panel display.

9. The image processing apparatus according to claim 1, wherein the external apparatus is a focus control apparatus that performs focus control for an image capturing apparatus that has captured the captured image.

10. A control method for an image processing apparatus, the method comprising:

obtaining a captured image;

obtaining a likelihood map indicating a likelihood of existence of an object at each position of the captured image;

obtaining, at each position of the captured image, a region tensor indicating a position and a size of an object with respect to each position;

accepting first position coordinates with respect to the captured image;

determining an object region corresponding to the first position coordinates, based on the region tensor and likelihoods of the likelihood map corresponding to two or more region candidates each indicated by the region tensor based on the first position coordinate;

determining a first object region based on the first position coordinates and a second object region based on second position coordinates determined from the first object region;

deciding a larger one of a first likelihood value corresponding to the first position coordinates in the likelihood map and a second likelihood value corresponding to the second position coordinates with respect to center of the object region in the likelihood map; and outputting the first object region to an external apparatus if it is decided that the first likelihood value is larger than the second likelihood value, and outputting the second object region to the external apparatus if it is decided that the first likelihood value is larger than the second likelihood value.

11. A non-transitory computer-readable recording medium storing a program for causing a computer to execute as an image processing apparatus, wherein the program causes the computer to:

obtain a captured image;

obtain a likelihood map indicating a likelihood of existence of an object at each position of the captured image;

obtain, at each position of the captured image, a region tensor indicating a position and a size of an object with respect to each position;

accept first position coordinates with respect to the captured image;

determine an object region corresponding to the first position coordinates, based on the region tensor and likelihoods of the likelihood map corresponding to two or more region candidates each indicated by the region tensor based on the first position coordinate;

determine a first object region based on the first position coordinates and a second object region based on second position coordinates determined from the first object region;

decide a larger one of a first likelihood value corresponding to the first position coordinates in the likelihood map and a second likelihood value corresponding to the second position coordinates with respect to center of the object region in the likelihood map; and output the first object region to an external apparatus if it is decided that the first likelihood value is larger than the second likelihood value, and output the second object region to the external apparatus if it is decided that the first likelihood value is larger than the second likelihood value.

* * * * *